US012522356B2

United States Patent
Ha et al.

(10) Patent No.: US 12,522,356 B2
(45) Date of Patent: Jan. 13, 2026

(54) METHODS, SYSTEMS, AND DEVICES FOR A SEAT FOR A VEHICLE

(71) Applicant: SUPERNAL, LLC, Washington, DC (US)

(72) Inventors: Christopher Ha, Irvine, CA (US); Alexander Pozzi, Carlsbad, CA (US)

(73) Assignee: SUPERNAL, LLC, Irvine, CA (US)

( * ) Notice: Subject to any disclaimer, the term of this patent is extended or adjusted under 35 U.S.C. 154(b) by 315 days.

(21) Appl. No.: 18/221,375

(22) Filed: Jul. 12, 2023

(65) Prior Publication Data

US 2024/0017829 A1    Jan. 18, 2024

Related U.S. Application Data

(60) Provisional application No. 63/368,334, filed on Jul. 13, 2022.

(51) Int. Cl.
| | |
|---|---|
| *B64D 11/00* | (2006.01) |
| *A61B 5/021* | (2006.01) |
| *A61B 5/024* | (2006.01) |
| *A61B 5/145* | (2006.01) |
| *B64D 11/06* | (2006.01) |

(52) U.S. Cl.
CPC .... *B64D 11/00152* (2014.12); *A61B 5/02141* (2013.01); *A61B 5/024* (2013.01); *A61B 5/14542* (2013.01); *B64D 11/0638* (2014.12); *B64D 11/0646* (2014.12); *B64D 11/0624* (2014.12)

(58) Field of Classification Search
CPC .......... B60N 2/682; B60N 3/004; A47C 7/68; A47C 7/705; A47C 7/70; A47C 7/624; A47B 31/06

USPC ................. 297/452.18, 146; 108/44
See application file for complete search history.

(56) References Cited

U.S. PATENT DOCUMENTS

| | | | | |
|---|---|---|---|---|
| 2,619,395 | A * | 11/1952 | Kent ...................... | B60N 3/004 297/146 |
| 5,370,060 | A * | 12/1994 | Wang ..................... | B60N 3/004 297/163 |
| 5,642,674 | A * | 7/1997 | Joye, Sr ............... | A47B 23/002 108/43 |
| 5,813,354 | A * | 9/1998 | Scott ..................... | B60N 3/004 297/146 |
| 5,878,672 | A * | 3/1999 | Ostermann ............ | B60N 3/004 297/188.06 |
| 5,984,347 | A * | 11/1999 | Blanc-Rosset ......... | B60N 3/004 280/727 |
| 6,006,462 | A * | 12/1999 | Lackomar ............... | B60R 7/043 40/643 |
| 6,502,900 | B1 * | 1/2003 | Johnston ................ | B60N 2/879 297/188.05 |
| 6,679,188 | B1 * | 1/2004 | Spagnoli, Jr. .......... | B60N 3/004 108/44 |

(Continued)

*Primary Examiner* — Jose V Chen
(74) *Attorney, Agent, or Firm* — MCDONNELL BOEHNEN HULBERT & BERGHOFF LLP

(57) ABSTRACT

A seat having a frame and a chair component coupled with the frame. The chair component includes a front side and a rear side such that the front side has a bucket-shaped portion configured to seat a passenger and the rear side is a seatback portion that is rear-facing. The seatback portion further includes a retaining clip configured to receive an electronic device and a lipped surface configured to retain a hanging personal belonging.

19 Claims, 16 Drawing Sheets

(56) References Cited

U.S. PATENT DOCUMENTS

| | | | | |
|---|---|---|---|---|
| 6,763,986 | B2* | 7/2004 | Santos | B60R 7/043 |
| | | | | 224/586 |
| 6,994,401 | B1* | 2/2006 | Fischer | B60N 2/58 |
| | | | | 297/452.56 |
| 7,658,153 | B1* | 2/2010 | Patoka | B60R 11/00 |
| | | | | 108/46 |
| 7,891,733 | B1* | 2/2011 | Clarke | B60R 11/00 |
| | | | | 211/85.3 |
| 8,327,774 | B1* | 12/2012 | Rivera | B60N 3/005 |
| | | | | 108/50.02 |
| 9,403,464 | B2* | 8/2016 | Valcic | B60R 7/043 |
| 9,610,879 | B2* | 4/2017 | Zheng | B60R 11/00 |
| 9,907,372 | B2* | 3/2018 | Dotey | A45C 13/02 |
| 11,738,676 | B2* | 8/2023 | Fan | B60N 3/004 |
| | | | | 108/28 |
| 2003/0233659 | A1* | 12/2003 | Guerin | B60N 3/004 |
| | | | | 725/77 |
| 2006/0075934 | A1* | 4/2006 | Ram | B64D 11/0015 |
| | | | | 108/44 |
| 2006/0175882 | A1* | 8/2006 | Schweizer | B60N 3/004 |
| | | | | 297/146 |
| 2007/0283855 | A1* | 12/2007 | Pozzi | A47B 23/043 |
| | | | | 108/44 |
| 2013/0093220 | A1* | 4/2013 | Pajic | H02J 50/10 |
| | | | | 297/163 |
| 2016/0121772 | A1* | 5/2016 | Stecko | B60N 3/103 |
| | | | | 108/44 |
| 2023/0312102 | A1* | 10/2023 | Dowty | B60N 3/004 |
| | | | | 297/146 |

* cited by examiner

METHODS, SYSTEMS, AND DEVICES FOR A SEAT FOR A VEHICLE

CROSS-REFERENCE TO RELATED APPLICATION

The present application claims priority to provisional U.S. Application No. 63/368,334 filed Jul. 13, 2022, the contents of which are hereby incorporated by reference in its entirety.

TECHNICAL FIELD

The present disclosure relates to seats, seat backs, seat frames, and seat shrouds in vehicle seating and ways in which such seating can be accommodated such that the user and/or sitter is able to make use of space while being provided with entertainment and accessory accommodations.

BACKGROUND

Seats, seat backs, seat frames and seat shrouds in any vehicle used to transport people, goods, or cargo do not allow the transported people and/or passengers from making optimal use of space. Many times, rudimentary coat hooks and non-adjustable tablet holders are the sole means that allow passengers to hold and stabilize personal belongings such as coats, jackets, and electronic devices safely. Such coat hooks may not allow for the securing of different-sized coats, jackets, and/or other pieces of garments and clothing. Moreover, the non-adjustable tablet holders are not adjustable by the passenger to allow for the securement of different-sized tablets, cell phones, laptops, and/or other electronic device(s). Such a lack of adjustability vis a vis non-adjustable tablet holders may lead to not only discomfort but also to ergonomic hardships represented by posture difficulties and pain as the passenger is forced to crouch and/or bend over to attend to and/or to watch his or her electronic device(s).

Thus, there exists a need to optimally space and provide additional features in the seats, seat backs, seat frames and seat shrouds in most vehicles—including wagons, bicycles, motor vehicles (motorcycles, cars, trucks, and/or buses), railed vehicles (trains, trams), watercraft vehicles (ships, boats, and/or other underwater vehicles), amphibious vehicles (screw-propelled vehicles and/or hovercrafts), aircraft (airplanes, helicopters, aerostats), and/or spacecraft, among others—to ensure functionality and comfort for the transported people and/or passengers. In such a manner, the passenger(s) makes optimal use of the seat space during the ride and/or flight while also being provided with entertainment and accessory accommodations for the passenger and his or her belonging(s).

Moreover, in a vertical take-off and landing (VTOL) aircraft, there is an increasing need for efficient, scalable, safe, easily manufactured, and economically feasible vertical take-off and landing craft. There is demand for such craft (whether it be autonomous, piloted, or a combination of both) capable of traveling a variety of distances for a variety of applications, including but not limited to package delivery, photography, and shuttling/taxiing individuals or goods. A person of ordinary skill in the art will realize that, to improve aircraft efficiency, it is important to minimize the weight of the components of the aircraft. In addition, in the interest of efficiency, it is also important to include components on the aircraft that may be able to improve range of the aircraft and conserve power on the aircraft such that the aircraft may be configured to be more effectual. Therefore, in order to minimize weight in a VTOL craft without a loss of functionality, there is a need to provide a slimmer seat for passengers incorporating less infrastructure surrounding the seats that still provides a level of ease and convenience for users and passengers. Typical aircraft seating does not satisfy these requirements because this level of simplicity and weight efficiency is not needed on a larger craft. Therefore, typical aircraft seating may be bigger, take up more room inside the cabin, and weigh more than allowed in a VTOL craft. In order to be incorporated into a VTOL craft to maximize weight efficiency without compromising functionality, a new seat solution is required.

SUMMARY

Different from conventional solutions, the disclosed seat apparatus solves the above problem by providing a unique seat for a vehicle that allows passenger(s) to place clothing, garments, and/or electronic device(s) in a convenient and ergonomic-friendly manner thereby allowing for improved use of the seat space, ergonomic-friendly adjustment, comfort, and entertainment and accessory accommodations for the passenger(s).

An example embodiment includes a seat having a frame and a chair component coupled with the frame. The chair component includes a front side and a rear side such that the front side has a bucket-shaped portion configured to seat a passenger and the rear side is a seatback portion that is rear-facing. The seatback portion has a retaining clip configured to receive an electronic device and a lipped surface configured to retain a hanging personal belonging.

Another example embodiment includes a craft having a body including a cabin. The cabin includes a first seat having a first frame and a first chair component coupled with the first frame. The first chair component includes a first front side and a first rear side such that the first front side has a bucket-shaped portion configured to seat a first passenger and the first rear side is a seatback portion that is rear-facing. The seatback portion has a retaining clip configured to receive an electronic device and a lipped surface configured to retain a hanging personal belonging. The craft also includes a first wing extending from a first side of the body of the craft, a second wing extending from a second side of the body of the craft opposite the first side of the body of the craft, a plurality of rotors, and a tail.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the present invention.

DETAILED DESCRIPTION

Reference will now be made in detail to exemplary embodiments, shown in the accompanying drawings.

The present disclosure relates to seats, seat backs, seat frames and seat shrouds in any vehicle used to transport people, passengers, goods, and/or cargo. Note that the term 'vehicle' may indeed encompass a large number of modern vehicles, including wagons, bicycles, motor vehicles (motorcycles, cars, trucks, and/or buses), railed vehicles (trains, trams), watercraft vehicles (ships, boats, and/or other underwater vehicles), amphibious vehicles (screw-propelled vehicles and/or hovercrafts), aircraft (airplanes, helicopters, aerostats), and/or spacecraft, among others. The above list is not, in any manner, supposed to signify a limited list of what the term 'vehicle' defines in terms of structure.

Figure 1:
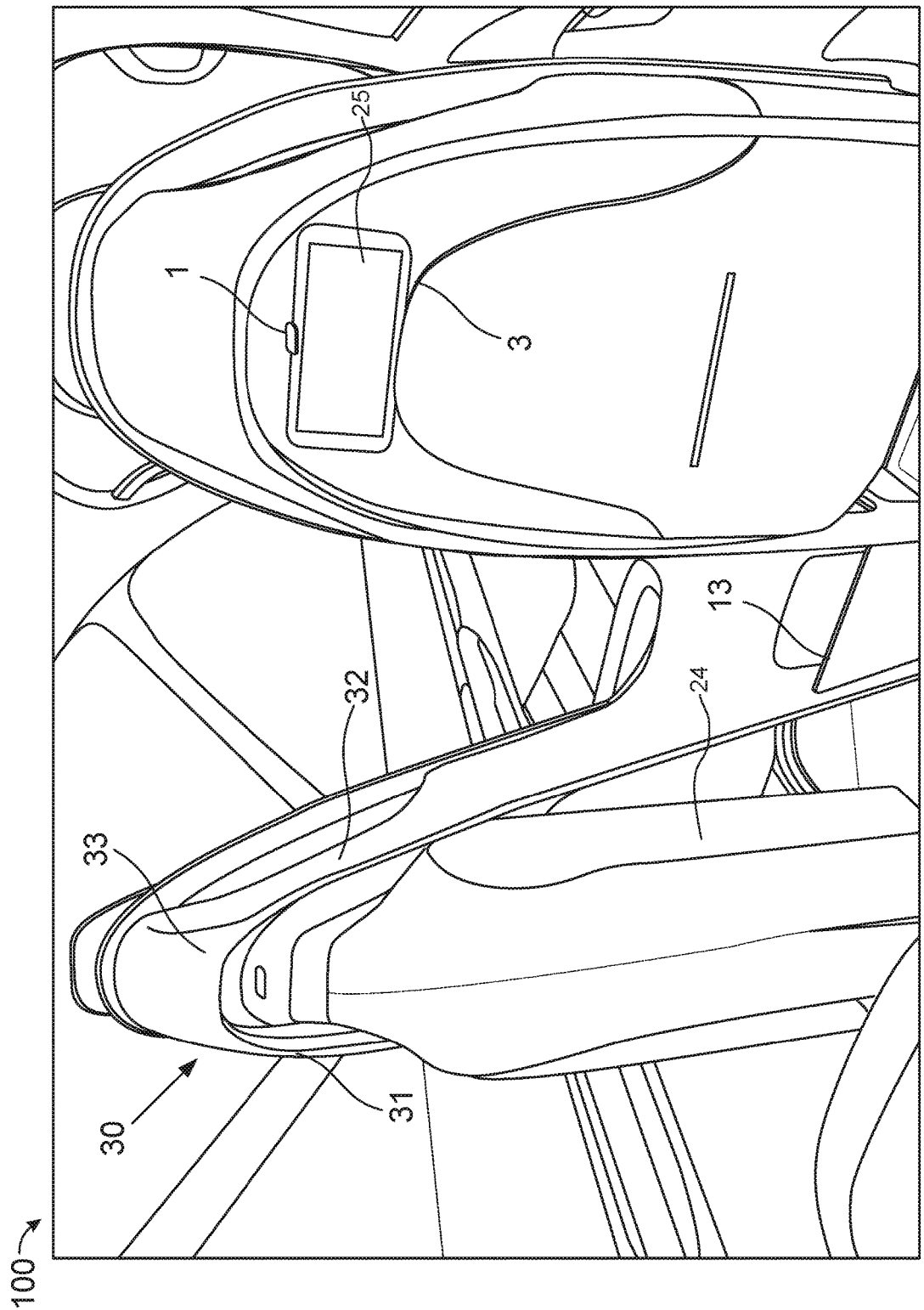
FIG. 1 illustrates an exemplary seat for a vehicle according to an embodiment of the present invention.
Figure 2:
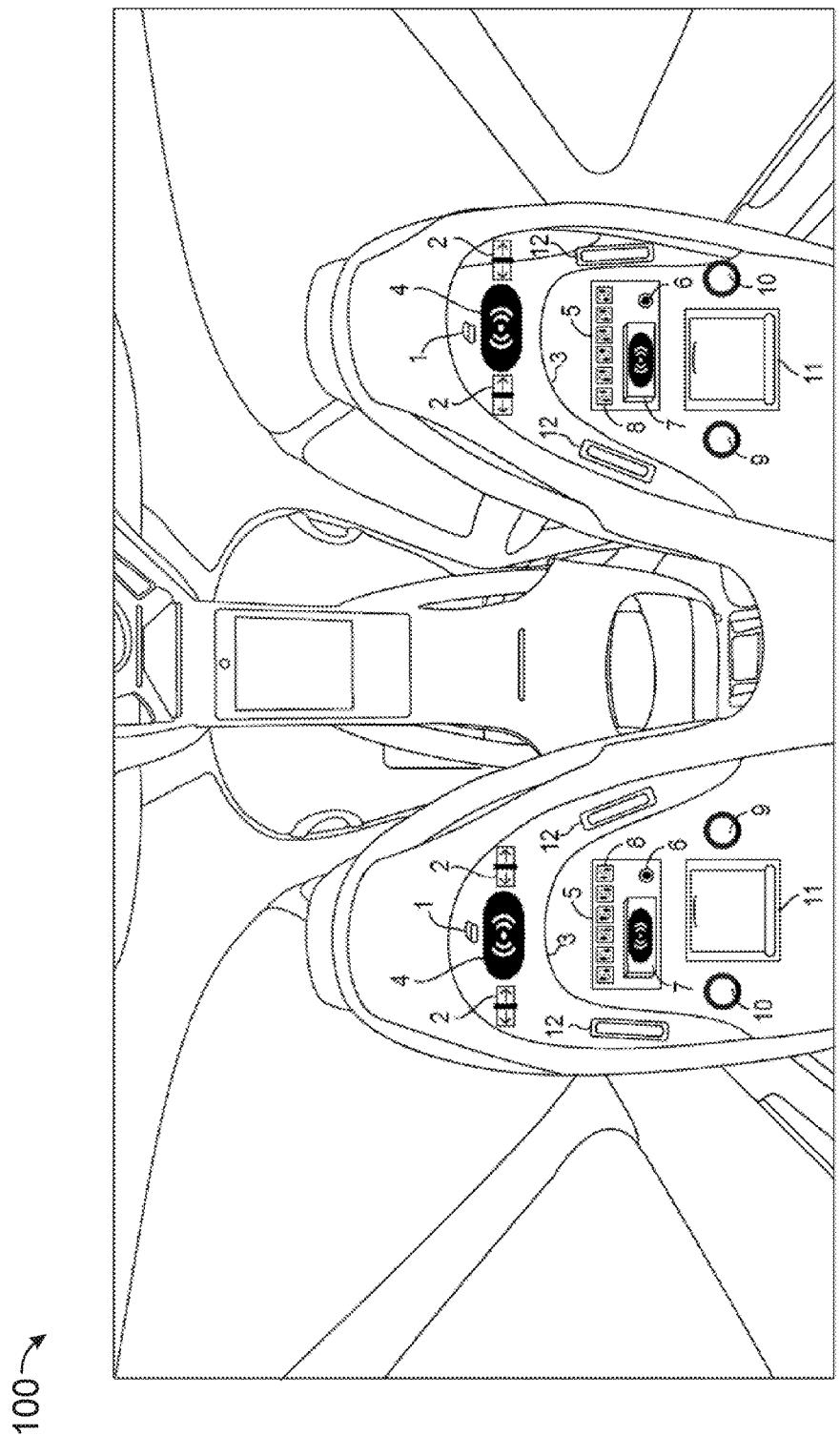
FIG. 2 illustrates an exemplary seat for a vehicle according to an embodiment of the present invention.
Figure 3:
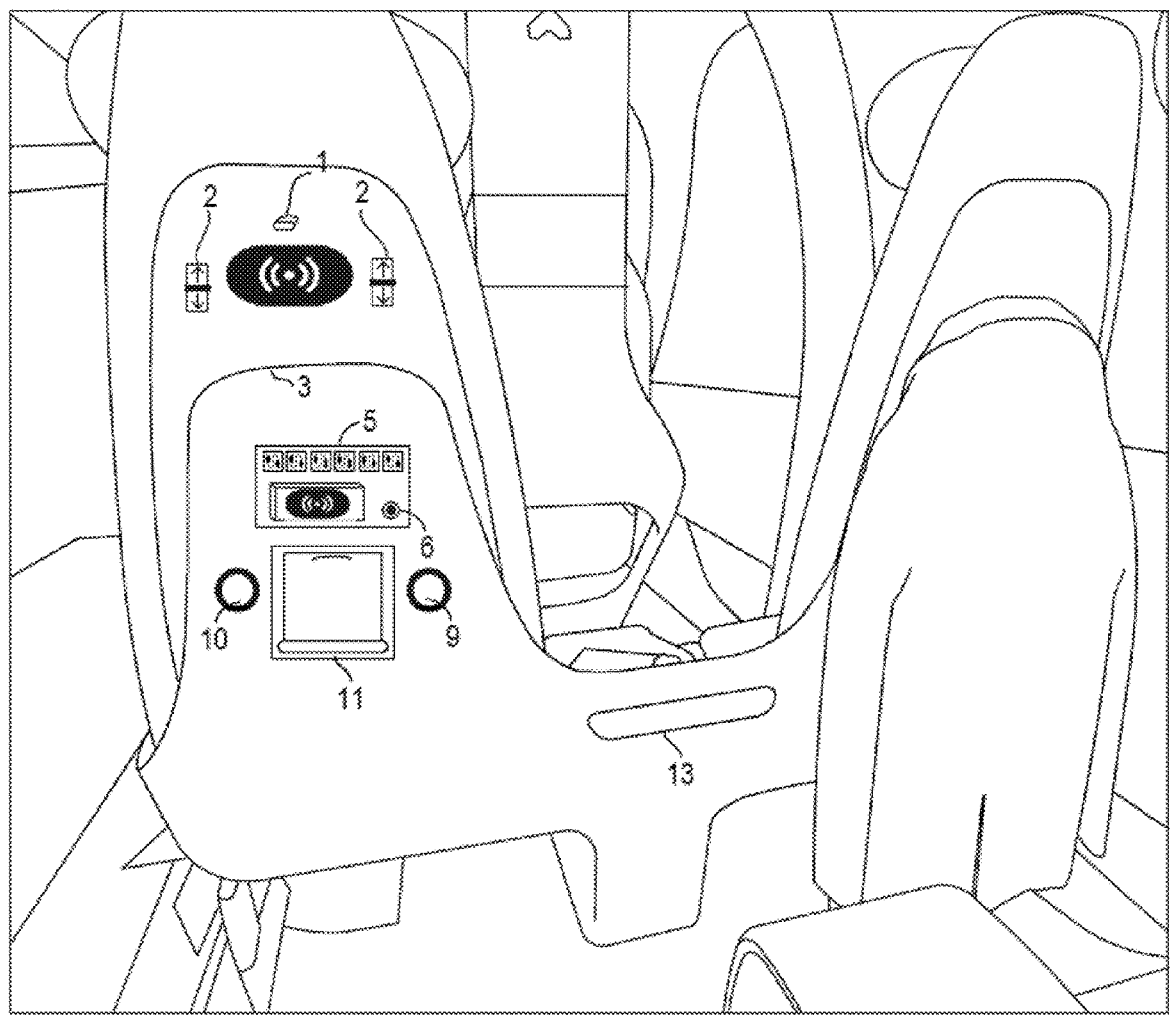
FIG. 3 illustrates an example of a seat for a vehicle according to an embodiment of the present invention.
Figure 4:
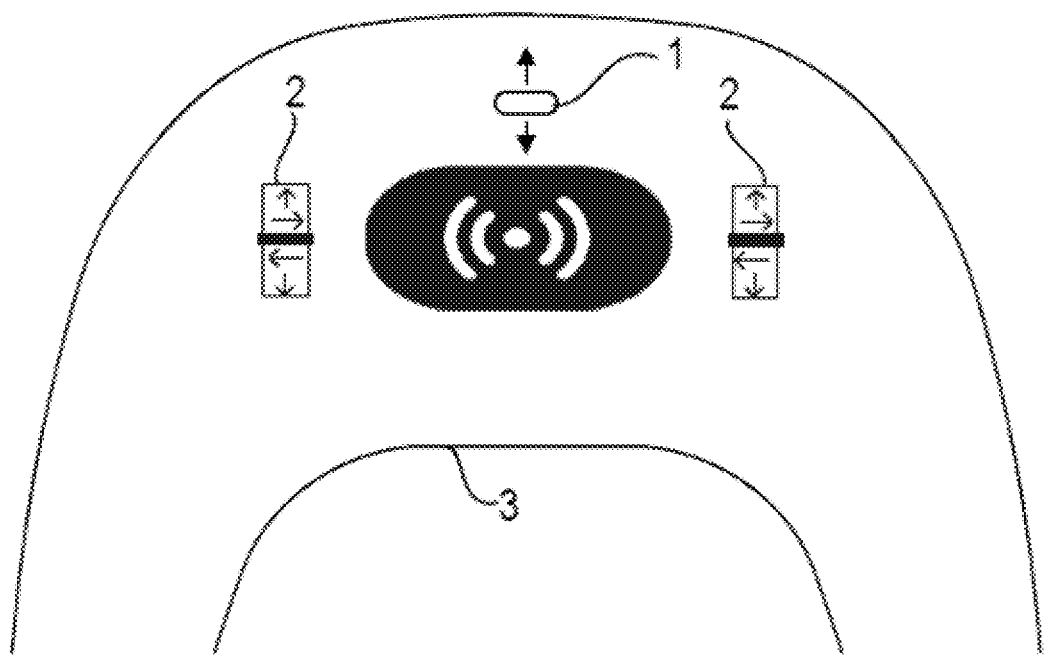
FIG. 4 illustrates a detailed view of the contoured ledges and the contoured side ledges.

FIGS. 1-3 illustrate an example of a seat 100 that may be utilized in any type of vehicle, including but not limited to motor vehicles, railed vehicles, watercraft vehicles, amphibious vehicles, and/or spacecraft, as discussed above. As can be seen in FIGS. 1-3, the seat may include a retaining clip configured to receive an electronic device 25 such as contoured ledges that secure and hold in place the electronic device 25, wherein this electronic device may be any such electronic device including, but not limited to, electronic devices such as phones, tablets, laptops, monitors, and/or screens. Such an example electronic 25 device may be seen in FIG. 1. As seen in FIGS. 2-4, the contoured ledges may comprise a contoured ledge 1 that may be movable and slidable up and down; thus, the passenger may adjust the location of the contoured ledge 1 to fit his or her electronic device and position the electronic device in an ergonomically pleasant manner and convenient height such that the passenger is not required to crunch or lean over to attend to or view the electronic device. Alternatively, the contoured ledge 1 may be immobile and/or stationary such that the user(s) and/or passenger(s) is able to clip an electronic device such that the electronic device rests between the top of a lipped surface configured to retain a hanging personal belonging 24, such as hanger 3, and the contoured ledge 1, as seen in at least FIGS. 1-4. In other embodiments, the user(s) and/or passenger(s) may be able to clip an electronic device 25 to one contoured ledge, such as contoured ledge 1.

Figure 5:
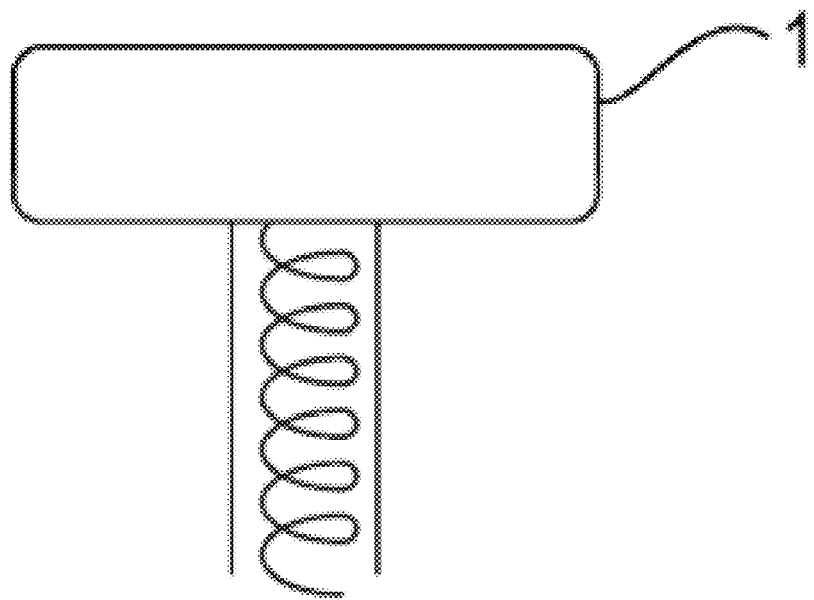
FIG. 5 illustrates the spring-loaded mechanism of the respective contoured ledges and the contoured side ledges.

The contoured ledges may also comprise contoured side ledges 2 that are movable and slidable left to right; thus, the passenger may adjust the location of the contoured side ledges 2 to fit his or her electronic device and position the electronic device in an ergonomically pleasant manner and convenient height such that the passenger is not required to crunch or lean over to attend to or view the electronic device. The movement and sliding of such contoured ledges 1 and contoured side ledges 2 can also be seen in FIGS. 2-4. Note that any number of additional contoured ledges may indeed be added to the seat to ensure the securement of the electronic device; moreover, such additional contoured ledges may also be slidable, movable, adjustable and may indeed move in an angular direction, not necessarily only the perpendicular directions (up and down and left and right) mentioned above. Alternatively, such additional contoured ledges may be completely stationary and immobile and act as a clip for the attached electronic device. Moreover, as can be seen in FIG. 5, the contoured ledges mentioned above may be spring-loaded ledges. Such a spring-loaded arrangement allows for the firm but malleable positioning of each of the contoured ledges and for the passenger's and/or user's smooth adjustment of such contoured ledges.

In some embodiments, the retaining clip configured to receive the electronic device, such as contoured ledge 1, is stationary such that the electronic device is configured to be retained between the contoured ledge 1 and a top of a lipped surface configured to retain the hanging personal belonging, such as the hanger 3. In other embodiments, the contoured ledge 1 includes two or more adjustable retaining portions configured to secure the electronic device between them. In some embodiments, the contoured ledge 1 includes an upper adjustable retaining portion and a lower adjustable retaining portion configured to secure the electronic device such that the upper adjustable retaining portion and the lower adjustable retaining portion are each configured to slide latitudinally. In some embodiments, the contoured ledge 1 includes a left adjustable retaining portion and a right adjustable retaining portion configured to secure the electronic device such that the left adjustable retaining portion and the right adjustable retaining portion are each configured to slide longitudinally. In some embodiments, the contoured ledge 1 includes two or more adjustable retaining portions configured to be adjusted circumferentially around a center. Other retaining mechanisms and/or designs of the contoured ledge 1 are also possible.

As can be further seen in at least FIGS. 2-4, a hanger 3 may allow for the hanging of garments and clothes wherein such clothes may include, by way of example, coats, jackets, sport jackets, shirts, etc. For example, at least FIG. 3 shows the hanging of a jacket on the hanger 3. Moreover, as seen in at least FIGS. 2-4, there may exist a wireless charging pad 4 that holds the aforementioned secured electronic device so that the electronic device may be simultaneously and/or continuously charged. Also, as seen in FIG. 2 and FIG. 3, there may exist a charging station 5 that allows for the charging of additional electronic devices, a right-hand cup holder 9 and a left-hand cup holder 10 that allows for the holding of cups, mugs, etc., for both right-handed and left-handed passengers respectively, a tray table 11 that allows for the holding and securing of meals and/or passenger accessories, a holder 12 that holds any printed work such as, by way of example, newspapers, magazines, journals, books, notebooks, etc., and a trash bin 13 that allows for the disposal of trash.

Figure 6:
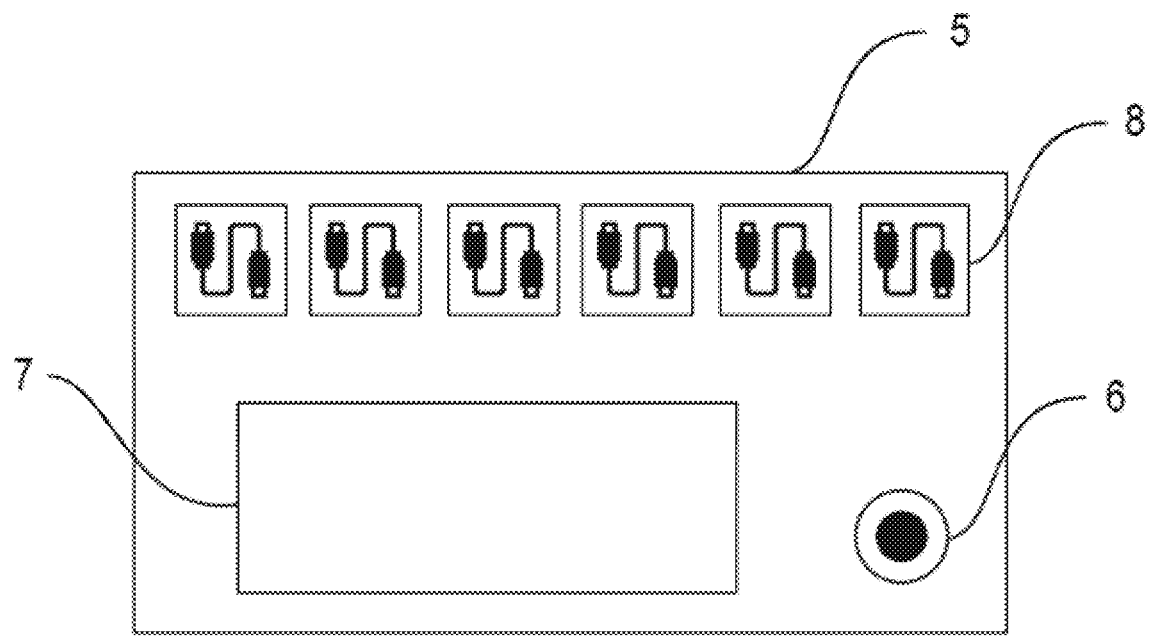
FIG. 6 illustrates a detailed view of the charging station wherein the wireless charging pad is retracted or stowed.
Figure 7:
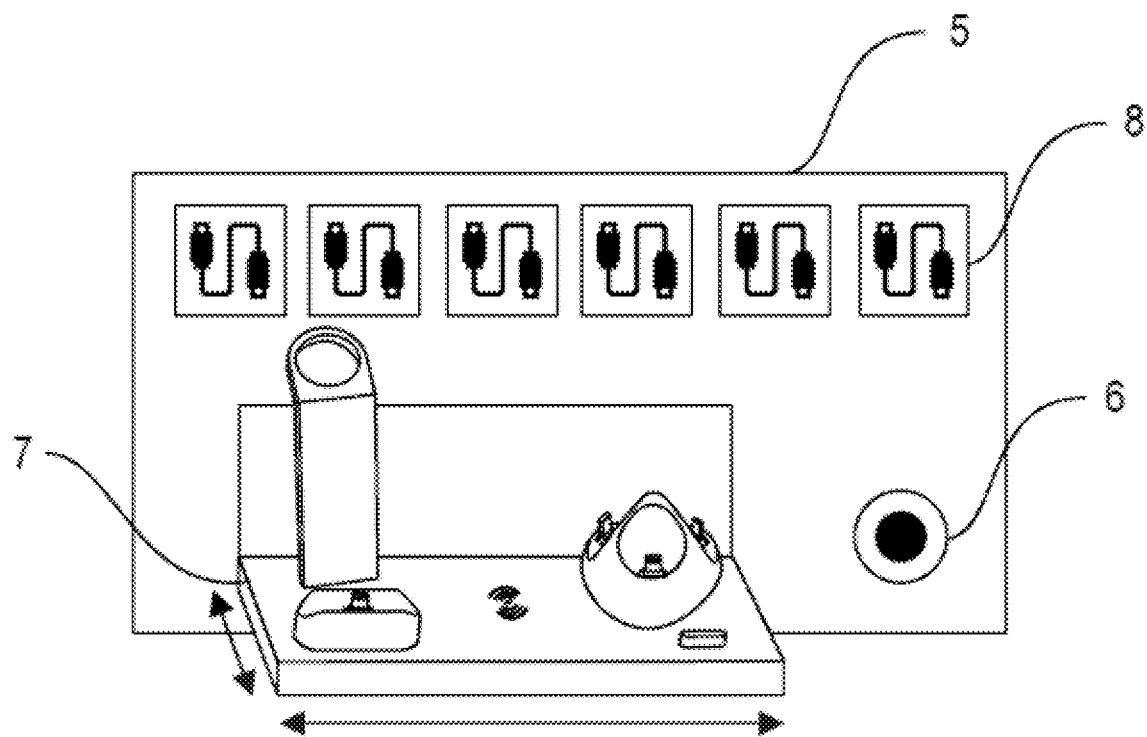
FIG. 7 illustrates a detailed view of the charging station wherein the wireless charging pad is extended outward.
Figure 8:
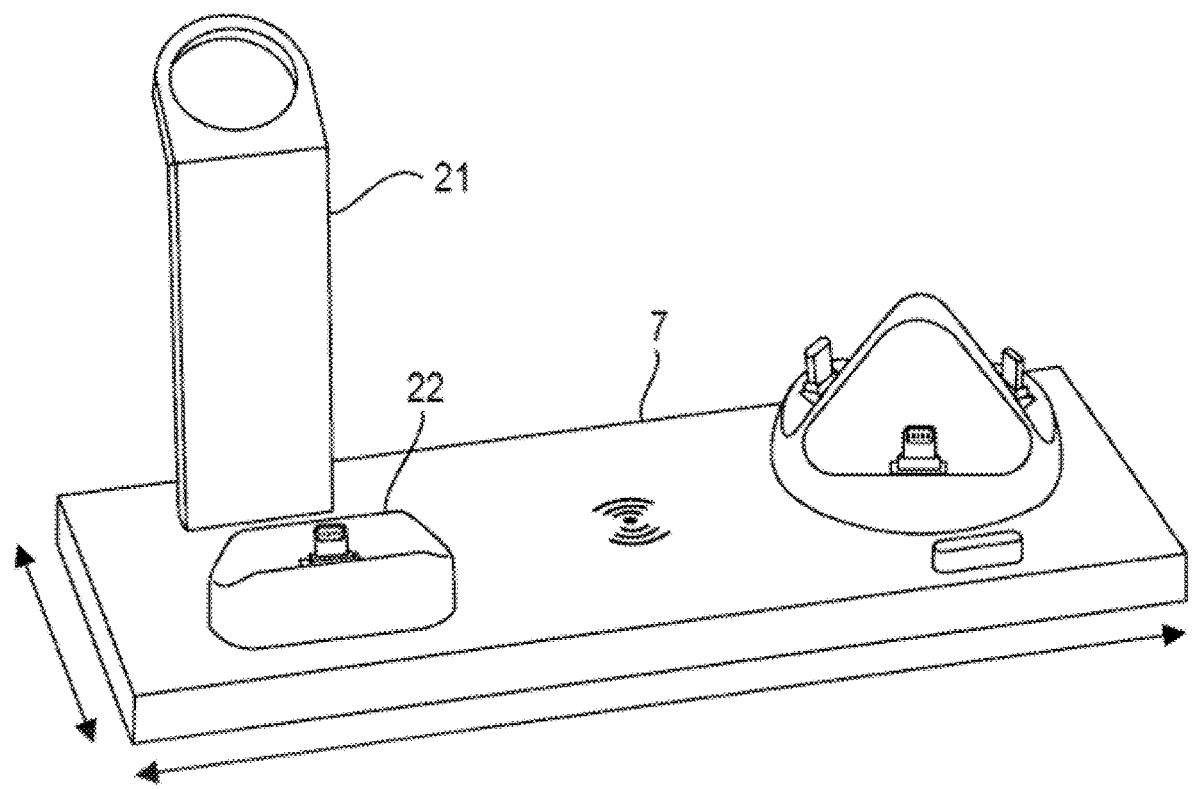
FIG. 8 illustrates a detailed view of the wireless charging pad, including its ability to be expanded and contracted in both a latitudinal direction and a longitudinal direction.

As to the charging station 5, it may further comprise, as seen in FIG. 2, FIG. 3, FIG. 6, and FIG. 7, a push button 6, a wireless charging pad 7, and electric and/or USB outlets 8. The wireless charging pad 7 may be retracted as seen in FIG. 6 or it may be extended outward as seen in FIG. 7; moreover, it is when the push button 6 is pushed and/or actuated by the passenger and/or user that the wireless charging pad 7 is extended outward. Furthermore, as best seen in FIG. 7 and FIG. 8, the wireless charging pad 7 may be expanded and contracted in both a latitudinal direction and a longitudinal direction. Such expansion and/or contraction may be adjusted by the passenger and/or user accordingly to fit the electronic device at hand, whether it be a phone, tablet, laptop, screen, and/or monitor. This ability of the wireless charging pad 7 allows for adjustment and convenience for the passenger and passenger's belongings. As seen in FIG. 8, the wireless charging pad 7 may further comprise a watch holder 21 to hold and/or charge a watch or a smartwatch and a headphone holder 22 to hold and/or charge headphones or wireless headphones, in addition to the pad space provided for the wireless charging of the electronic device. As such, the wireless charging pad 7 may indeed by utilized to simultaneously charge several electric devices such as, for example, a tablet, a smartwatch, and a wireless headphone set all at the same time, therefore providing functionality, convenience, and entertainment and accessory accommodations for the passenger(s) and/or user(s).

Figure 9:
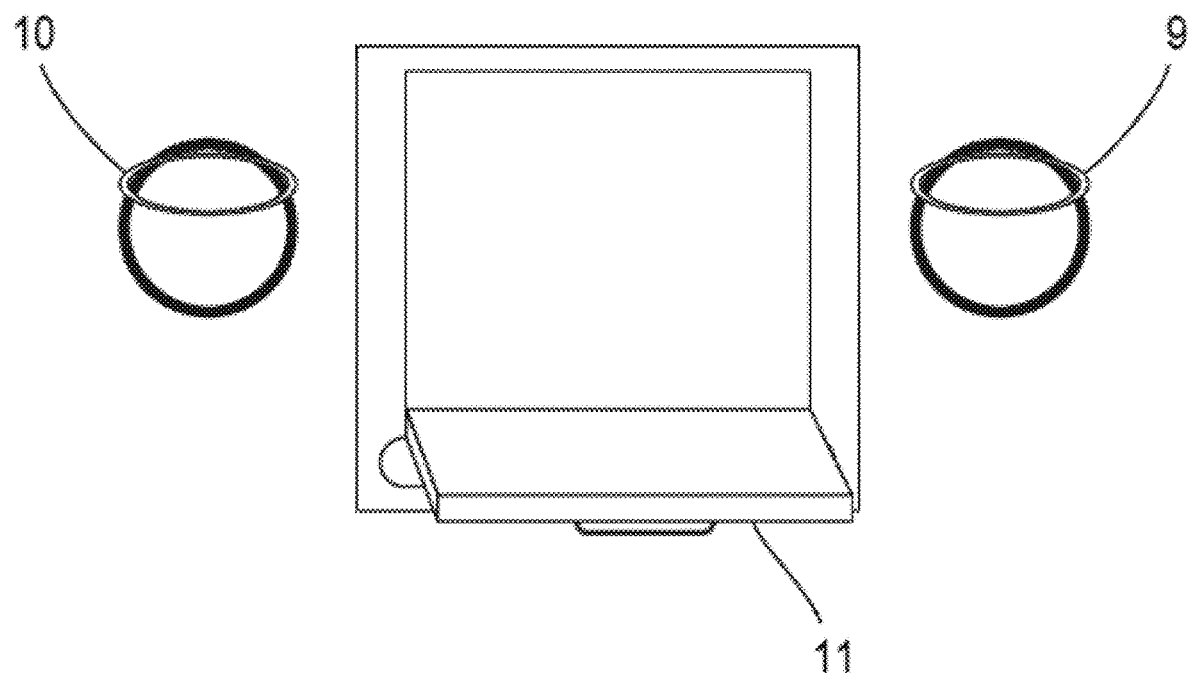
FIG. 9 illustrates a detailed view of the right-hand cup holder, the left-hand cup holder, and the tray table when extended outward.

Furthermore, as seen in FIG. 9, the user(s) and/or passenger(s) may indeed push each of the right-hand cup holder 9, the left-hand cup holder 10, and the tray table 11 to be extended to hold a mug or meal, respectively. As such, each of the right-hand cup holder 9, the left-hand cup holder 10, and the tray table 11 may be extendable and retractable accordingly.

Figure 10:
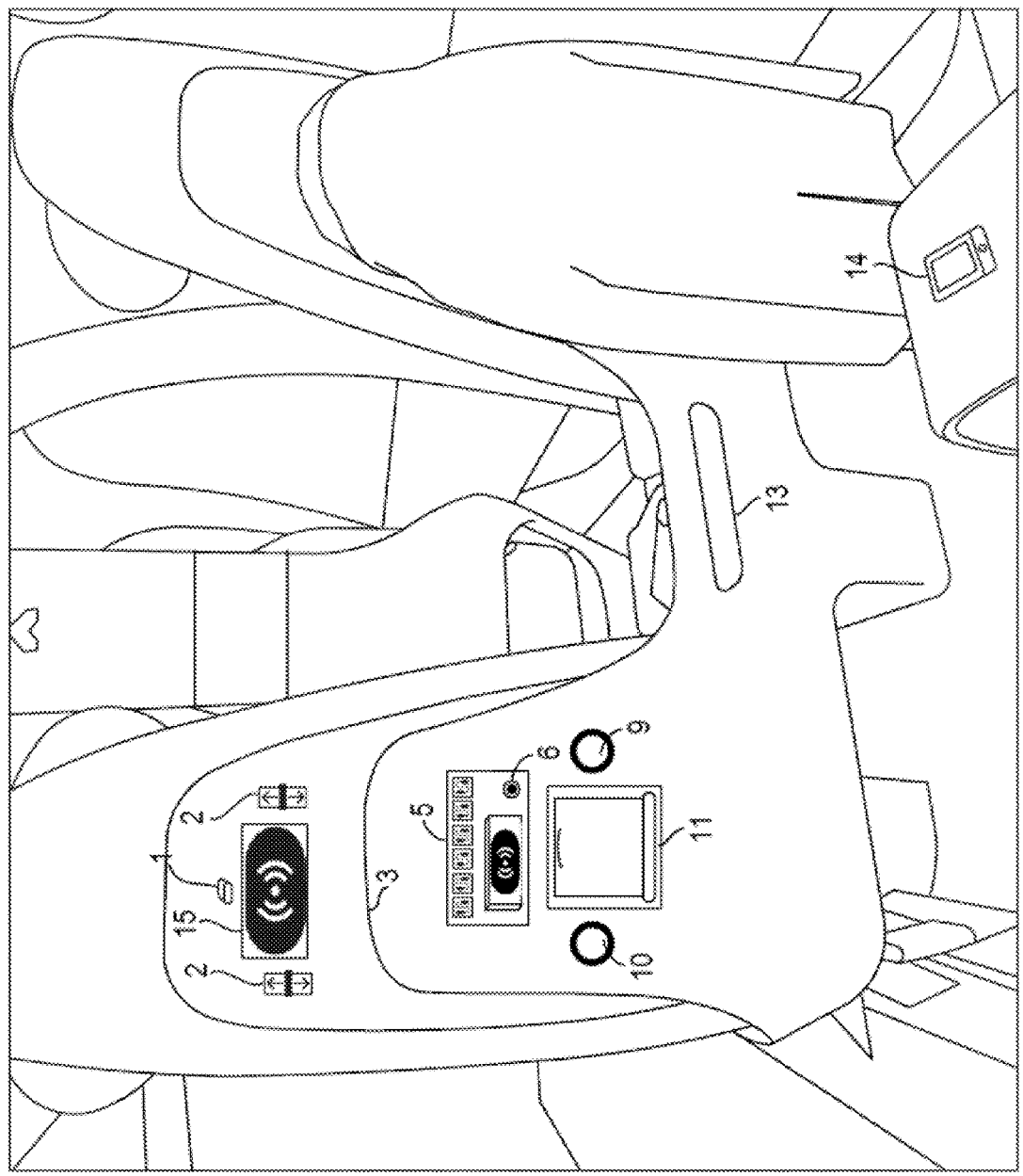
FIG. 10 illustrates an example of a seat for a vehicle according to an embodiment of the present invention providing on-screen entertainment or a streaming service.

As seen in FIG. 10, the seat for the vehicle may also be provided with an on-screen entertainment or a streaming service 15 that may be accessed by the user(s) and/or passenger(s) via a biomimetic sensor 14 wherein such a biomimetic sensor 14 is a fingerprint biomimetic sensor 14. The user(s) and/or passenger(s) may indeed simply place his or her fingerprint on the fingerprint biomimetic sensor 14 and thereafter all the steaming services wherein such a user(s) and/or passenger(s) is subscribed to and has access to may appear accordingly on the on-screen entertainment or a streaming service 15 for the user(s)' and/or passenger(s)' viewing pleasure and entertainment.

Figure 11:
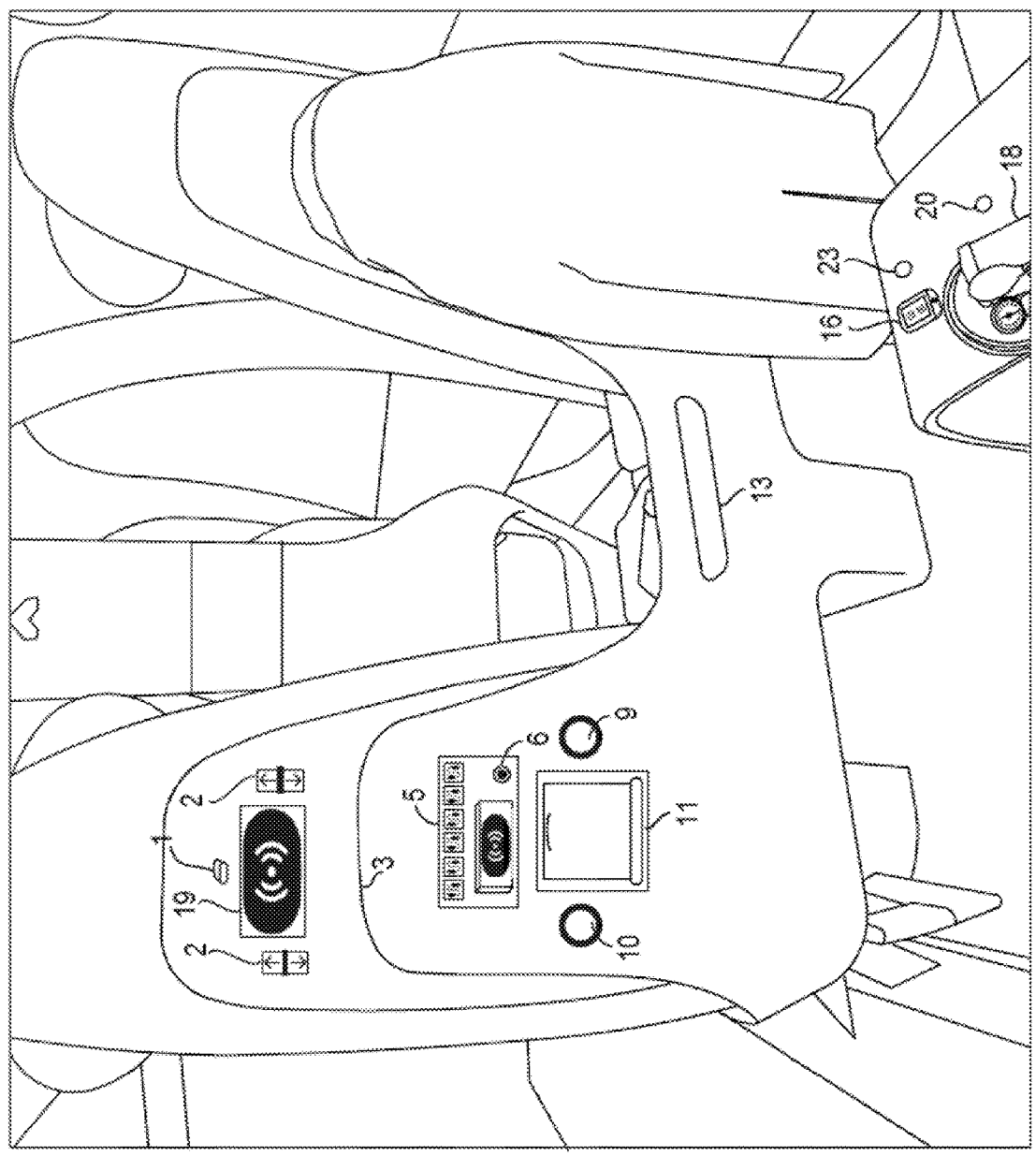
FIG. 11 illustrates an example of a seat for a vehicle according to an embodiment of the present invention providing a health and wellness monitor, a blood pressure cuff, and a pulse oximeter.

As seen in FIG. 11, the seat for the vehicle may also be provided with health monitoring accessories, such as a pulse oximeter 16, a blood pressure cuff 18, and a health and wellness monitor 19. The user(s) and/or passenger(s) may choose to view relevant health data metrics and/or data by simply using the pulse oximeter 16 to measure, monitor, and display the user's and/or passenger's oxygen saturation data, readings, and/or metrics on the health and wellness monitor 19. Alternatively, and/or conjunctionally, the user(s) and/or passenger(s) may use the blood pressure cuff 18 to measure, monitor, and display the user's and/or passenger's blood pressure data and/or heart rate data on the health and wellness monitor 19.

Figure 12:
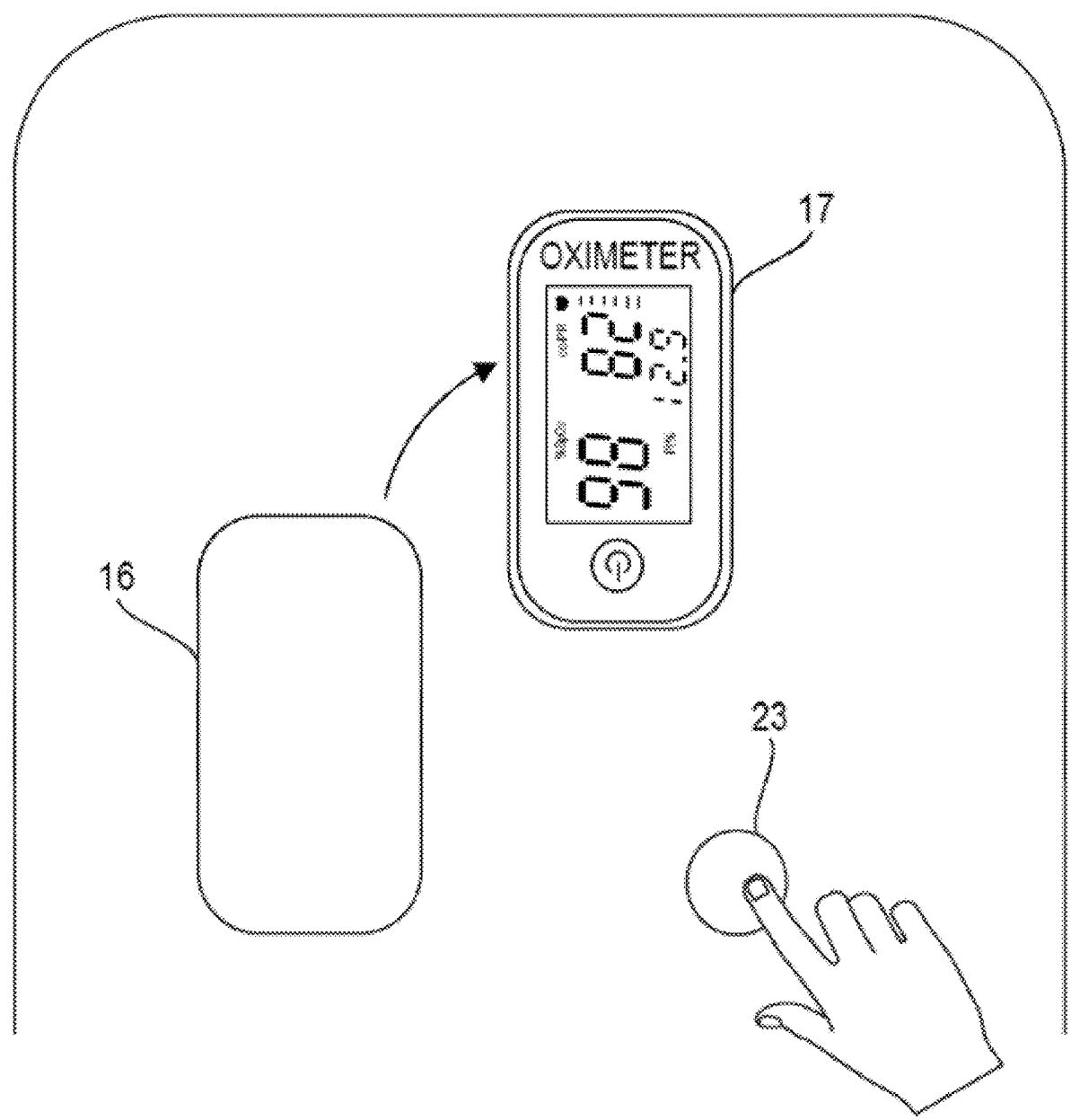
FIG. 12 illustrates a detailed view of the pulse oximeter.

As can be seen in FIG. 11 and FIG. 12, the user and/or passenger may utilize the pulse oximeter actuator 23 to extend the pulse oximeter fingertip 17 which allows the user(s) and/or passenger(s) to place his or her fingertip upon the pulse oximeter fingertip 17 to ensure that the measurement and reading of the oxygen saturation takes place.

Figure 13:
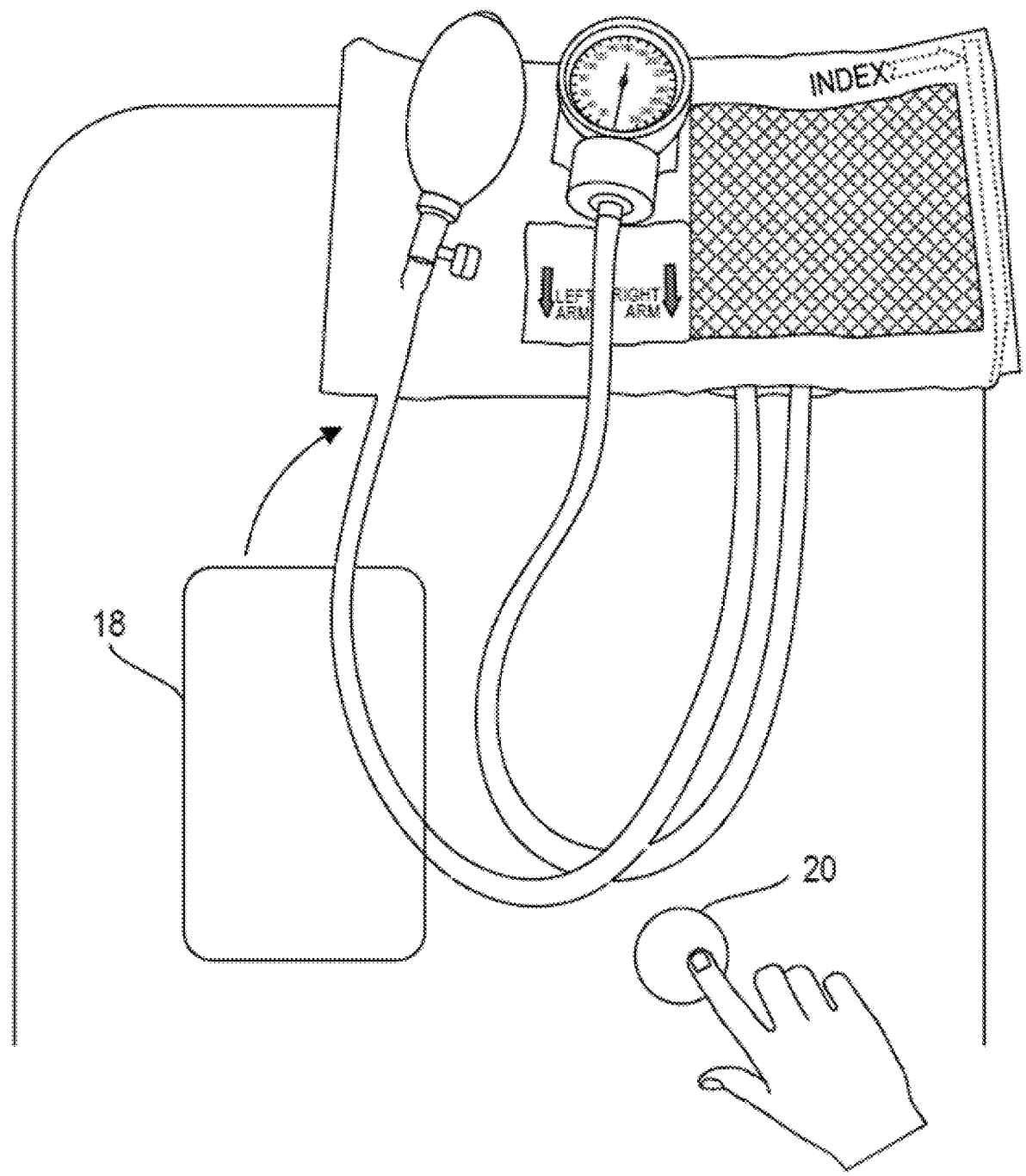
FIG. 13 illustrates a detailed view of the blood pressure cuff.

Moreover, as can be seen in FIG. 11 and FIG. 13, the user and/or passenger may utilize the blood pressure actuator 20 to extend the blood pressure cuff 18 which allows the user(s) and/or passenger(s) to place his or her wrist, hand, or arm to ensure that the measurement and reading of the blood pressure and heart rate takes place.

Furthermore, the exemplary seat may also include lighting that may be a reading light, wherein the reading light may be actuated by the user(s) and/or passenger(s) to aid in reading. The lighting may further comprise lighting to brighten, dim, accentuate, or in any way alter and/or modify the elements shown in the exemplary on-screen entertainment or streaming service 15 and/or the health and wellness monitor 19.

As can be seen in FIG. 1, seat 100 may also include a balance grip 30 on a rear side of the seat. In some embodiments, the balance grip 30 may include a first handle portion 31, a second handle portion 32, and an upper connecting portion 33 extending between the first handle portion 31 and the second handle portion 32. The balance grip 30 may be used by a passenger or other user during ingress and egress from a vehicle. For instance, the balance grip may be structured to be suitable for placement of a user's hand around either the first handle portion 31, the second handle portion 32, or both simultaneously such that the passenger may be able to pull themselves into their respective seat, across a neighboring seat, or to support and aid the passenger in balancing during ingress and egress.

The balance grip 30 may have particular dimensions of the first handle portion 31, second handle portion 32, and space between the first handle portion 31, second handle portion 32, and the rear side of seat 100. In some embodiments, the first handle portion 31 and the second handle portion 32 may each have a length between 250 mm to 500 mm, such as a length around 380 mm long, and the circumference may be between 30 mm to 50 mm, such as 40 mm wide. In some embodiments, the first handle portion 31 and the second handle portion 32 may have a constant diameter. In other embodiments, the first handle portion 31 and the second handle portion 32 may each have a unique contoured shape in order to aid passengers better during ingress and egress from the vehicle in which seat 100 is located. In some embodiments, the first handle portion 31 and the second handle portion 32 may each be spaced away from the rear side of the seat 100 by a distance. The distance may be between 30 mm to 50 mm, such as 40 mm. In some embodiments, the distance may be constant down a length of the first handle portion 31 and the second handle portion 32. In other embodiments, the distance may vary down a length of the first handle portion 31 and the second handle portion 32. Other shapes and dimensions of the balance grip 30 are also possible.

In some embodiments, the balance grip 30 may be integrated into the frame of the seat 100 such that use of the balance grip 30 by a passenger does not interfere with a passenger sitting in the seat to which the balance grip 30 is attached. Further, in some embodiments, the upper connecting portion 33 may also include a second lipped surface configured to retain a second hanging belonging that is similarly-structured to the hanger 3 on seat 100. This second lipped surface may also be positioned to not encroach into the space of the passenger sitting in the seat to which the balance grip 30 is attached. In some embodiments, the upper connecting portion 33 may include one or more integrated lights to illuminate a portion of the rear of seat 100. The one or more integrated lights may be adjustable and have controlled on/off capabilities such that a passenger may choose to illuminate the one or more integrated lights to have a better view of the other components in the rear portion of seat 100, such as the contoured ledge 1, the hanger 3, or other seat components.

Figure 14:
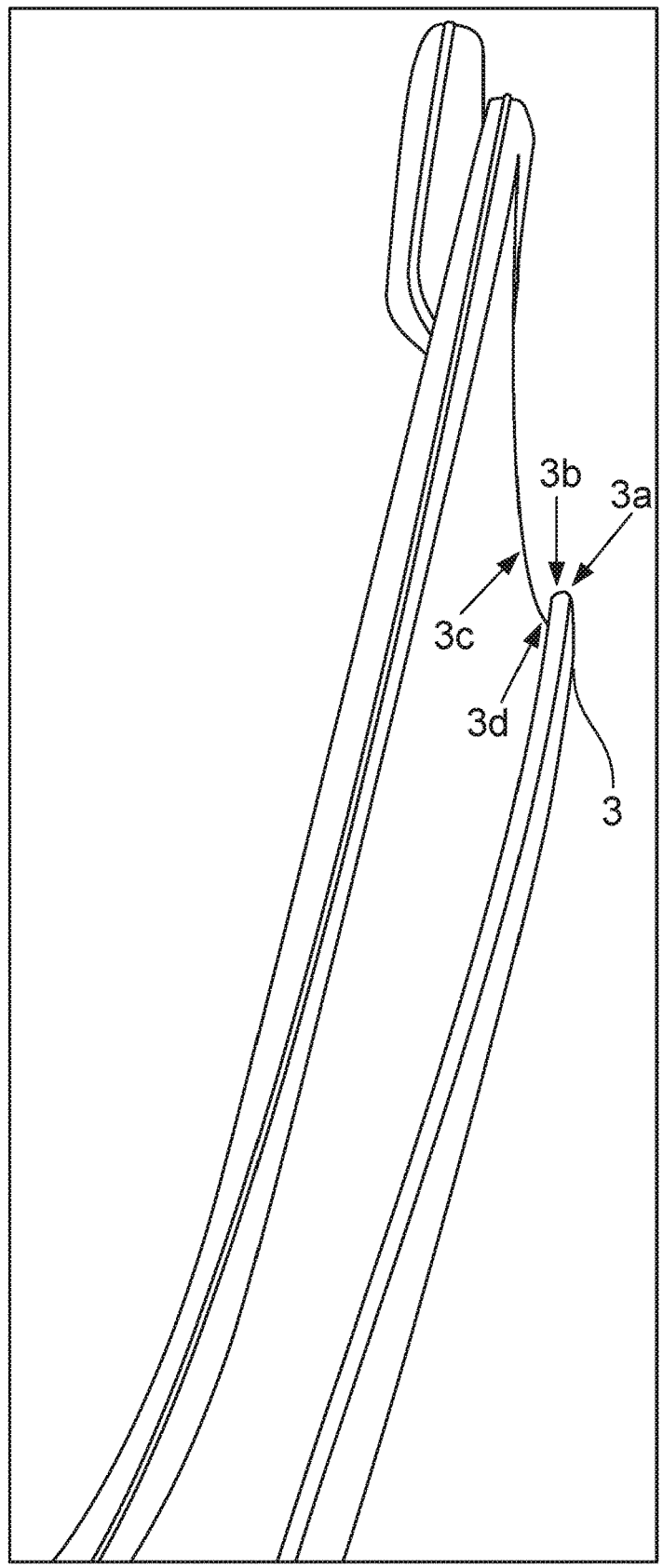
FIG. 14 is a side view of an exemplary seat for a vehicle according to an embodiment of the present invention.

FIG. 14 illustrates a side view of the seat 100 according to an example embodiment of the present invention. A lipped surface, such as the hanger 3, may be configured to have a particular shape with regard to a rear portion of seat 100 in some embodiments. For instance, the hanger 3 may include a rounded upper shape 3a, a retaining rim 3b, a tapered seatback portion 3c, and a lower valley portion 3d. In some embodiments, a personal belonging of a passenger is able to be hung around rounded the upper shape 3a of the hanger 3 such that it is retained between the retaining rim 3b and the tapered seatback portion 3c. Further, in some embodiments, an electronic device is also able to be retained between the contoured ledge 1 and the hanger 3 such that the electronic device is retained between the retaining rim 3b and the tapered seatback portion 3c. The lower valley portion 3d may be sized and shaped to prevent the electronic device to slide below the rounded upper shape 3a such that a portion of a display of the electronic device is not blocked behind the rounded upper shape 3a of the hanger 3. For instance, in some embodiments, a distance between a top of rounded upper shape 3a and the lower valley portion 3d may be between 6 mm to 10 mm long, such as 6 mm or 10 mm long. Other shapes and sizes of the hanger 3 are also possible.

In some embodiments, the hanger 3 may be rounded such that a variety of hanging personal belongings are able to be hung on its lipped surface, over the rounded upper shape 3a. Further, in some embodiments, the hanger 3 may have a particular width, such as between 150 mm to 250 mm across. The width of the hanger 3 may be selected such that a passenger's personal belonging may be held by the hanger 3 in an effective manner. For instance, the width of the hanger 3 may be selected such that a passenger's coat is able to be held by the hanger 3 such that the shoulders of the passenger's coat are raised enough to prevent wrinkling the garment and/or allowing the garment to contact the floor of the vehicle. By utilizing this width of the hanger 3, the passenger's garment may be prevented from being scrunched around a tiny hook, such as is available in other vehicles, as well as simultaneously allowing for better access to other seatback features in the rear portion of seat 100.

Figure 15:
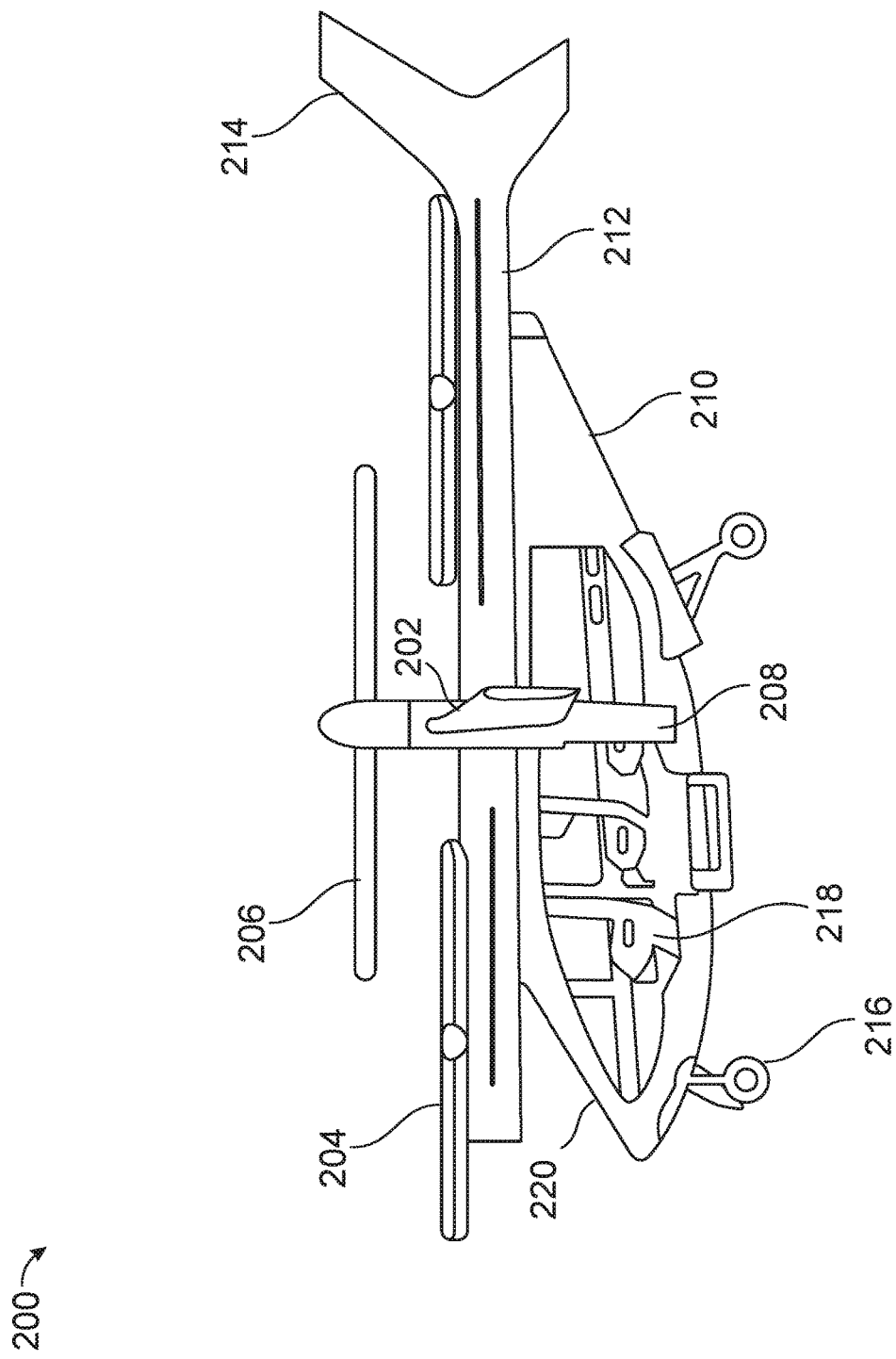
FIG. 15 is a view of a craft, according to an exemplary embodiment of the present invention.

FIG. 15 illustrates a craft 200 in a vertical take-off and landing configuration according to an example embodiment of the present invention. As shown in FIG. 15, the craft 200 may include, among other things, one or more lift surfaces 202, one or more lift propellers 204, one or more tilting propellers 206 which may be mounted on respective hubs 208, a body 210, one or more booms 212, and a tail 214. The body 210 may include gear 216 for landing on land and/or water, which may or may not be retractable. The body 210 may also include a cockpit, such as cabin 218, configured to hold a pilot, passenger(s), and/or cargo. The body 210 may also include a windshield 220 of any suitable shape and size; one or more doors configured to open and/or close (e.g., by swinging, sliding, and/or raising/lowering) to allow ingress/egress of persons and/or cargo; one or more seats; and controls and/or a computer system configured to communicate and/or control craft systems for the craft. The craft 200 may be manned or unmanned. It is envisioned that craft 200 may be used for any purpose known to those skilled in the art, including for example, as a taxi, a delivery vehicle, a personal vehicle, a cargo transport, a short or long-distance hauling aircraft, and/or a video/photography craft.

Figure 16:
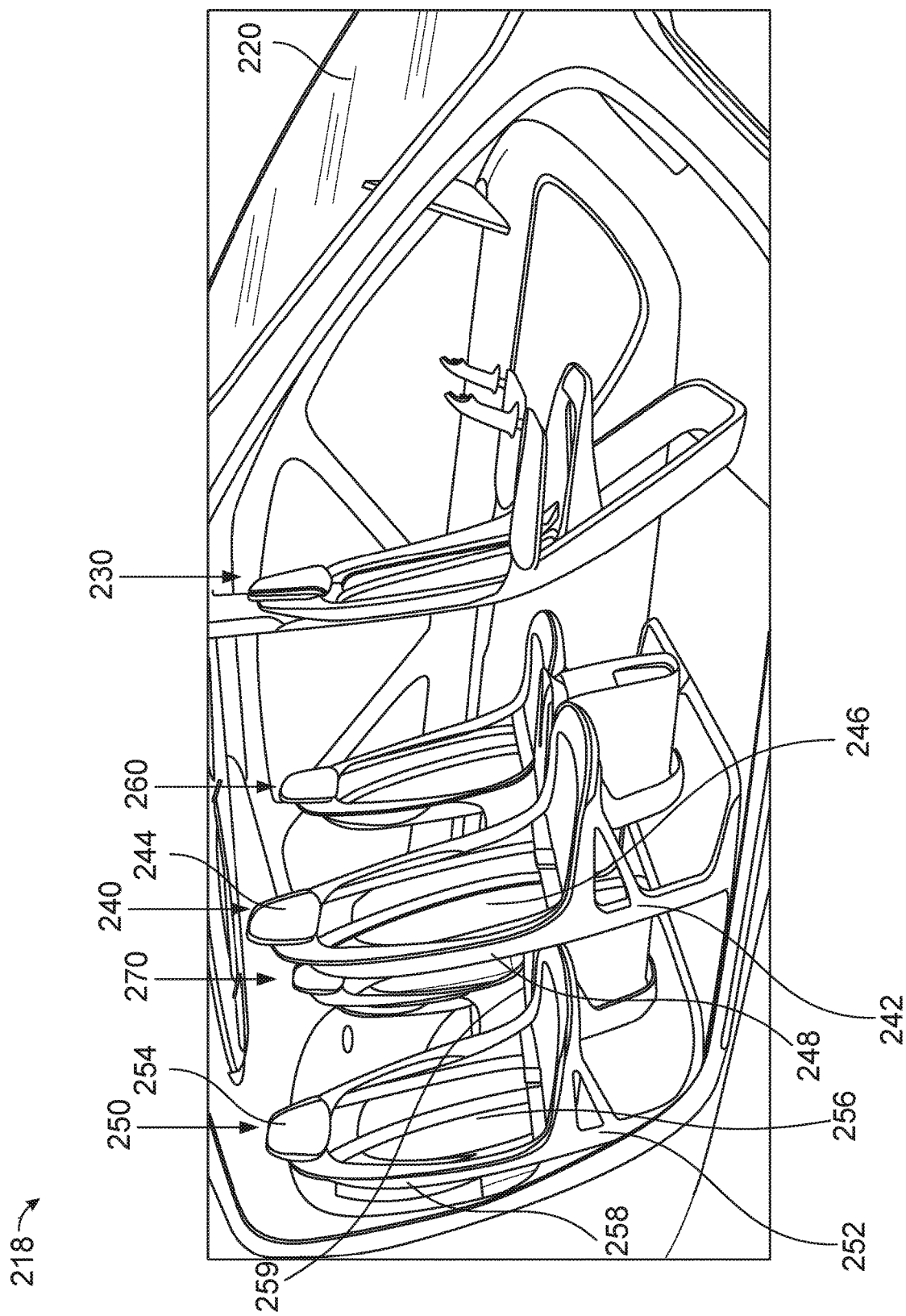
FIG. 16 is a perspective view of a cabin within the craft of FIG. 15, according to an exemplary embodiment of the present invention.

FIG. 16 illustrates an interior to cabin 218 of craft 200 according to an example embodiment of the present invention. In some embodiments, the cabin 218 may include a captain seat 230, a first seat 240, a second seat 250, a third seat 260, and a fourth seat 270. Other arrangements and numbers of seats within the cabin 218 are also possible.

In some embodiments, the captain seat 230, the first seat 240, the second seat 250, the third seat 260, and the fourth seat 270 each include a frame and a chair component coupled with the frame having a front side and a rear side. The front side has a bucket-shaped portion configured to seat a passenger and the rear side is a seatback portion that is rear-facing. For instance, the first seat 240 may include a frame 242 and a chair component 244 coupled with the frame 242 having a front side and a rear side. The front side has a bucket-shaped portion 246 configured to seat a passenger and the rear side is a seatback portion 248 that is rear-facing. Further, the second seat 250 may include a frame 252 and a chair component 254 coupled with the frame 252 having a front side and a rear side. The front side has a bucket-shaped portion 256 configured to seat a passenger and the rear side is a seatback portion 258 that is rear-facing. The second seat 250 may also include an armrest 259 next to a segment of the bucket-shaped portion 256 of second seat 250. In some embodiments, the bucket-shaped portion 246 of the first seat 240 and the bucket-shaped portion 256 of the second seat 250 may each include a removable fabric portion that is able to be pulled away from the frame 242 for cleaning, personal safety, or the like.

In some embodiments, the seatback portion 248 of the first seat 240 and the seatback portion 258 of the second seat 250 may each also include any component of seat 100 described in FIGS. 1-14, such as a retaining clip configured to receive an electronic device or a lipped surface configured to retain a hanging personal belonging. For example, a second passenger sitting in the second seat 250 may be able to retain a personal electronic device using an at least one retaining clip in the seatback portion 248 of the first seat 240. The retaining clip in the seatback portion 248 of the first seat 240 may include any feature of the contoured ledge 1 described above.

In some embodiments, the seatback portion 248 of the first seat 240 may include a health and wellness monitor, such as the health and wellness monitors described above. In the at least one armrest 259 of the second seat 250 may be a health monitoring device configured to collect health monitoring data from the second passenger seated in the second seat 250 and display the collected health monitoring data on the health and wellness monitor in the seatback portion 248 of the first seat 240. In some embodiments, the health monitoring device may be a blood pressure cuff and may include a blood pressure actuator configured to extend the blood pressure cuff from a first stowing position in the at least one armrest 259 of the second seat 250. As such, the health and wellness monitor in the seatback portion 248 of the first seat 240 may be configured to display blood pressure data collected by the blood pressure cuff. In other embodiments, the health monitoring device may be a pulse oximeter and may include a pulse oximeter actuator configured to extend the pulse oximeter from a second stowing position in the at least one armrest 259 of the second seat 250. As such, the health and wellness monitor in the seatback portion 248 of the first seat 240 may be configured to display oxygen saturation data collected by the pulse oximeter.

It will be apparent to persons skilled in the art that various modifications and variations can be made to disclosed structure. While illustrative embodiments have been described herein, the scope of the present invention includes any and all embodiments having equivalent elements, modifications, omissions, combinations (e.g., of aspects across various embodiments), adaptations and/or alterations as would be appreciated by those skilled in the art based on the present invention. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present invention. It is intended, therefore, that the specification and examples be considered as exemplary only, with a true scope and spirit of the present invention being indicated by the following claims and their full scope of equivalents.

What is claimed is:

1. A seat comprising:
   a frame; and
   a chair component coupled with the frame comprising a front side and a rear side,
   wherein the front side has a bucket-shaped portion configured to seat a passenger and the rear side is a seatback portion that is rear-facing, the seatback portion comprising:
      a retaining clip configured to receive an electronic device; and
      a lipped surface configured to retain a hanging personal belonging, wherein the lipped surface comprises:
         a rounded upper shape,
         a retaining rim,
         a tapered seatback portion, and
         a lower valley portion, wherein the hanging personal belonging is configured to be hung around the rounded upper shape such that the hanging personal belonging is retained between the retaining rim and the tapered seatback portion.

2. The seat of claim 1, wherein the seatback portion further comprises at least one of:
   a wireless charging pad for the electronic device;
   a charging station configured to charge an at least additional electronic device;
   a retractable cup holder;
   a retractable tray table; and
   a slot to retain a printed work.

3. The seat of claim 1, wherein the seatback portion further comprises a health and wellness monitor configured to display relevant health data.

4. The seat of claim 3, further comprising an armrest extending from the front side of the chair component of the seat, the armrest comprising a blood pressure cuff and a blood pressure actuator configured to extend the blood pressure cuff from a first stowing position in the armrest.

5. The seat of claim 4, wherein a second health and wellness monitor in a second seatback portion of a second seat that is in front of the seat is configured to display blood pressure data collected by the blood pressure cuff.

6. The seat of claim 3, further comprising an armrest extending from the front side of the chair component of the seat, the armrest comprising a pulse oximeter and a pulse oximeter actuator configured to extend the pulse oximeter from a second stowing position in the armrest.

7. The seat of claim 6, wherein a second health and wellness monitor in a second seatback portion of a second seat that is in front of the seat is configured to display oxygen saturation data collected by the pulse oximeter.

8. The seat of claim 1, wherein the retaining clip configured to receive the electronic device is stationary such that the electronic device is configured to be retained between the retaining clip and a top of the lipped surface configured to retain the hanging personal belonging.

9. The seat of claim 1, wherein the retaining clip comprises two or more adjustable retaining portions configured to secure the electronic device between them.

10. The seat of claim 1, wherein the retaining clip comprises an upper adjustable retaining portion and a lower adjustable retaining portion configured to secure the electronic device, and wherein the upper adjustable retaining portion and the lower adjustable retaining portion are each configured to slide latitudinally.

11. The seat of claim 1, wherein the retaining clip comprises a left adjustable retaining portion and a right adjustable retaining portion configured to secure the electronic device, and wherein the left adjustable retaining portion and the right adjustable retaining portion are each configured to slide longitudinally.

12. The seat of claim 1, wherein the retaining clip comprises two or more adjustable retaining portions configured to be adjusted circumferentially around a center.

13. The seat of claim 1, wherein the retaining clip is spring-loaded.

14. The seat of claim 1, wherein the lipped surface is shaped and sized so as to receive the hanging personal belonging.

15. The seat of claim 1, wherein the electronic device provides on-screen entertainment or a streaming service via a biomimetic sensor.

16. The seat of claim 1, wherein the frame further comprises a balance grip behind the rear side of the chair component, the balance grip having:
   a first handle portion;
   a second handle portion; and
   an upper connecting portion extending between the first handle portion and the second handle portion.

17. The seat of claim 16, wherein the upper connecting portion comprises a second lipped surface configured to retain a second hanging personal belonging.

18. A craft comprising:
   a body including a cabin, the cabin comprising:
      a first seat comprising:
         a first frame; and
         a first chair component coupled with the first frame comprising a first front side and a first rear side, wherein the first front side has a bucket-shaped portion configured to seat a first passenger and the first rear side is a seatback portion that is rear-facing, the seatback portion comprising:
            a retaining clip configured to receive an electronic device; and
            a lipped surface configured to retain a hanging personal belonging, wherein the lipped surface comprises:
               a rounded upper shape,
               a retaining rim,
               a tapered seatback portion, and
               a lower valley portion, wherein the hanging personal belonging is configured to be hung around the rounded upper shape such that the hanging personal belonging is retained between the retaining rim and the tapered seatback portion;
a first lift surface extending from a first side of the body of the craft;
a second lift surface extending from a second side of the body of the craft opposite the first side of the body of the craft;
a plurality of tilting propellers; and
a tail.

19. The craft of claim 18, further comprising:
a second seat aft the first seat, the second seat comprising:
   a second frame; and
   a second chair component coupled with the second frame comprising a second front side and a second rear side, wherein the second front side has a bucket-shaped portion configured to seat a second passenger and an at least one armrest and the second rear side is a seatback portion that is rear-facing;
a health and wellness monitor in the seatback portion of the first seat configured to display relevant health data; and
a health monitoring device in the at least one armrest of the second seat configured to:
   collect health monitoring data from the second passenger; and
   display the health monitoring data on the health and wellness monitor in the seatback portion of the first seat.

* * * * *